(No Model.) 2 Sheets—Sheet 2.

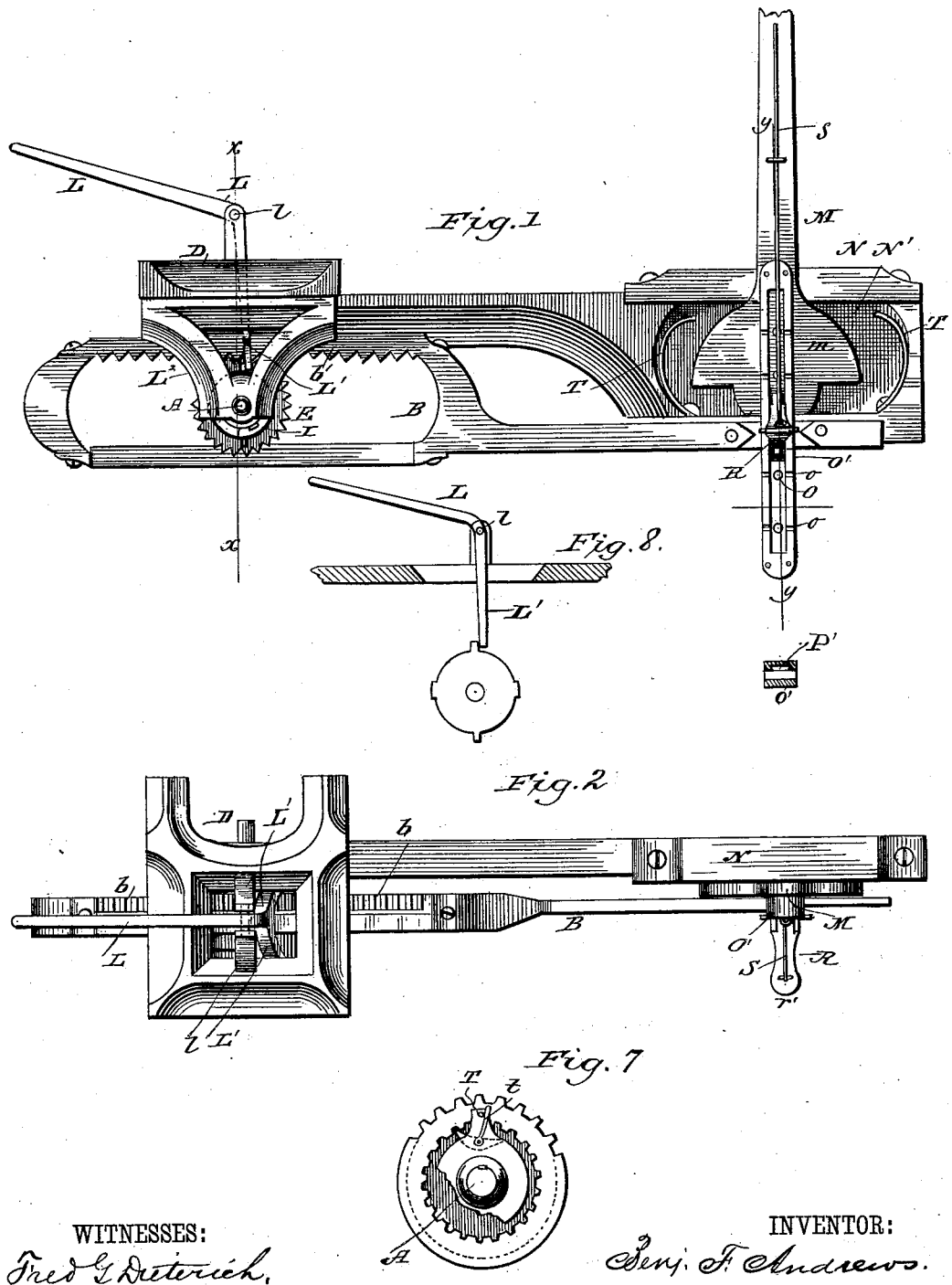

B. F. ANDREWS.
MECHANICAL MOVEMENT.

No. 385,084. Patented June 26, 1888.

WITNESSES:
Fred G. Dieterich
P. B. Turpin.

INVENTOR:
Benj. F. Andrews.
BY Munn & Co.
ATTORNEYS.

UNITED STATES PATENT OFFICE.

BENJAMIN F. ANDREWS, OF MYERS, MISSOURI.

MECHANICAL MOVEMENT.

SPECIFICATION forming part of Letters Patent No. 385,084, dated June 26, 1888.

Application filed February 8, 1888. Serial No. 263,299. (No model.)

*To all whom it may concern:*

Be it known that I, BENJAMIN FRANKLIN ANDREWS, of Myers, in the county of Howard and State of Missouri, have invented a new and useful Improvement in Mechanical Movements, of which the following is a specification.

This invention is an improvement in mechanical movements which seek to convert reciprocal or oscillating motion into rotary motion; and it consists in certain novel constructions and combinations of parts, as will be described and claimed.

In the use of my invention it may be applied to means for propelling vessels or vehicles, to various machines employed in the different useful arts, and to engines, as will be readily understood.

In the drawings, Figure 1 is a side and Fig. 2 a top plan view of my apparatus. Fig. 3 is a cross-section on about line $x\,x$, Fig. 1. Fig. 4 is a section on about line $z\,z$, Fig. 3. Figs. 5 and 6 are detail views illustrating the pawl tripper and carrier. Fig. 7 shows a different construction of pawl-tripping mechanism. Fig. 8 is a detail view in a somewhat diagrammatic form, illustrating the lever for use in reversing the apparatus; and Fig. 9 is a detail enlarged section on line $y\,y$, Fig. 1.

The apparatus comprises the shaft A, suitably supported so it may be revolved or turned, a slotted pitman, B, and an oscillating lever, M, connected with said pitman. In the arrangement shown the shaft A is supported in bearings below a frame, D. On the shaft A, I journal loosely the rack or toothed wheels E E', which fit close together at their inner faces and are formed alike. Each of these wheels E has a rabbet, $e$, cut in its inner side next its periphery, the two rabbets $e$ forming a way for the rails or guide-plates $b^2$ on the slotted pitman. These wheels E E' are fitted to be meshed by the racks $b\,b'$ on the slotted pitman, which racks mesh the said wheels on opposite sides thereof, so that one rack, $b$, meshing the wheel E, serves to revolve the said wheel in one direction, while the rack $b'$ will revolve the wheel E' in the opposite direction, the said wheels E E' being so clutched to the shaft A that they will slip on the shaft when turned in one direction and grip the shaft in the other direction of movement, so that one wheel will turn the shaft as the pitman is moved forward and the other will turn the shaft as the pitman is retracted, one of said wheels being operative as regards turning the shaft as the pitman moves forward and the other being operative as the pitman is retracted. On the outer sides or faces of the said wheels E E' are formed or provided teeth $f$, for engagement by the pawls, and by preference I form such teeth in the circular or peripheral walls of sockets or recesses F, formed in the outer faces of such wheels E E', as shown. These sockets receive the inner ends of pawl-carriers G, which latter are fixed on the shaft A and support the pawl or pawls H. It is preferred to use a number of said pawls in each carrier or support, as shown. The pawl-carrier has a recess, $g$, in its periphery, near its inner edge, and the pawl is seated in said recess, such pawl being double-ended and supported so either end may be tilted out in position to engage the teeth $f$ of the rack-wheels. By tilting one or the other of said ends out the rack-wheels will engage said pawls and turn the pawl-supports, and consequently the shaft, in one or the opposite direction. Thus by adjusting these pawls the apparatus may be operated to turn the shaft in one direction and then quickly set to reverse such turning by throwing the opposite end of the pawl out. In order to conveniently adjust these pawls to operate as desired, I provide what for convenience of reference I shall term "pawl-trippers" I, consisting of rings I', fitted on the pawl-supports alongside of the rack-wheels and over the portions of the pawls which project beyond the sides of said rack-wheels. These rings I' have tripping projections $i$, extended into position to engage the pawl, so that by partially turning the tripper on the pawl-support the projection will tilt the pawl and throw one or the other end thereof out in position to be engaged by the teeth of the rack-wheel. By preference this projection $i$ is not fixed rigidly to the inner side of the tripper-ring I, but projects into a socket, $i'$, formed radially through such ring, and is actuated by a spring, $i^2$, such spring preferably bearing between said projection and a cover-plate, J, movable in guides $j$ over the outer end of the opening $i'$. In their inner edges the rings I' have notches $k$, arranged in sets of three, and I preferably provide two of such sets in each ring and arrange them diametrically opposite each other. These notches are entered by spring-pressed studs K', fitted in sockets in the pawl-supports and pressed outwardly by their springs into engagement with the notches k. These studs K' also have at the outer sides of their outer ends extensions k', which, when the studs are in their outermost positions, project along the outer sides of rings I' and hold the said rings on the supports. When these studs fit in the central notches, k, they secure the ring I' relatively to the pawls and their supports, so such pawls will be entirely out of engagement with the toothed wheels. When the studs K' rest in one or the other end notch, k, one or the other end of the pawls will be out, as will be readily understood.

By pressing the studs K' inward the rings I' may be moved off the pawl-support to permit the renewal of the pawls or for other desired purposes.

By adjusting the trippers I to set their projections i over the central part of the pawl the latter will be held with both ends clear of the toothed wheels, so that the shaft will not be turned by the rotation of said wheels. The projections i, it will be seen, also serve to give a spring-tension to the pawls; but manifestly, where a number of pawls are used in each support, they will properly act by gravity, and it will not be necessary to use any springs for the purpose of throwing them into engagement with the rack-wheels. It will also be understood that it would involve no departure from my invention to operate the pawls as friction-pawls against a friction-surface instead of forming the teeth s for engagement with said pawls.

In the construction shown in Fig. 7 the double-ended pawl has a spring-arm, t, fixed to it and arranged to engage against one or the opposite sides of a pin or projection, T. By adjusting the arm t to one or the opposite side of the projection T the pawl may be set to cause the shaft to be turned in one or the reverse direction. Obviously this construction would involve no departure from some of the broad features of my invention.

While the pawl-trippers may be turned independently and by grasping each directly by hand, it is preferred to provide a bar or lever, L, pivoted at l to the framing, and bifurcated forming-arms L', depending alongside the tripping-ring, and having their ends movable into and out of the path of projections L² on the rings I'.

In operation, when the rings are turning in one direction and it is desired to reverse the shaft, the lever has its ends l² thrown into position to engage the projections L² and stop the said rings I' and adjusting them to position to reverse the shaft, as will be readily understood from the drawings.

The lever, M, which I show for reciprocating the pitman is supported so it can move at its axial center in a frame, N, which frame has a recess, N', in which the pivotal portion of the lever is held, and is provided with similar rack-teeth, n n', in the opposite walls of said recess N'. The lever M has a toothed segment, m, fixed to it and meshing the rack n, and a toothed roller, m', is journaled to the lever and meshes the rack n', holding the segment m in mesh with rack n. The lever has a number or series of openings or sockets, O, and is provided above the same with a guide or keeper frame, O', having notches o in its upper side, which notches register with the sockets O and serve as guides in stopping the connecting-block, so the stop-stud will enter the sockets O, as desired.

The connecting-block P, to which the pitman is connected, is movable within the guide or keeper frame O', and has an opening, p, formed through it for the stop-stud Q, which stop-stud, when in its lowermost position, enters one of the openings O and locks the connecting-block to the lever. The block P preferably fits at its lower end in a dovetail groove, P', (see Fig. 1,) in the lever, and is held and movable longitudinally in said groove. At its upper end the said block slides between the side rails of the guide-frame, as shown. By adjusting the connecting-block, and with it the pitman, along the lever to and from the center of motion of said lever, the length of stroke of the pitman, and consequently the force and the speed of operation, may be varied. The stud Q is movable through the connecting-block and is given a tension toward the opening O by a spring, q. At its upper end the stud Q is connected with a three armed or branched lever, R, at the juncture of the arms r r of said lever with its handle-arm r'.

By tilting the lever R in either direction arms r will engage the connecting-block or, if desired, the keeper-frame, and will raise the stud out of the opening O, so the connecting-block and the pitman may be adjusted along the lever to the desired point, and then by releasing the triple-armed lever the stud will lock the parts in position. An especial advantage resulting from the form of lever shown is, that the arm r' of the lever may be pushed in either direction to release the stud, so that if it be desired to adjust the connecting-block down or up the lever it is only necessary to tilt the arm r' in the direction it is desired to adjust the connection of the pitman, when the stud will be released and the connection may be moved to the desired point, either up or down the lever.

It may be preferred to connect a rod, S, with the arm r', such rod extending along the lever to about the handle end of the same, so the connection of the pitman may be adjusted by the operator from the handle end of the lever, as will be understood from the drawings. While the connection-block is preferred because it renders the operation smoother and steadier, it is obvious that such connection-block might be omitted without rendering the apparatus inoperative; but as the connection-block avoids binding of the stud Q in the openings O, and for the further reasons mentioned above, such block improves the action of the apparatus, and is preferred, as stated.

To relieve any shock or jar in the operation of the lever, I provide its supporting-frame with cushions T T', arranged at the opposite end of such frame, which cushions are shown as spring-plates, and are engaged by the lever or parts connected therewith at the ends of its stroke, so as to ease the action of the machine. In the construction shown the spring-plates are secured at one end and have their other ends free. It will be understood that when desired the lever may be removed from the frame and applied thereto in the reverse direction—that is, with the handle portion of such lever projecting in a reverse direction from that shown.

Having thus described my invention, what I claim as new is—

1. In an apparatus for converting motion, the combination of the shaft, a toothed wheel loose thereon, a pawl-support fixed to said shaft, a double-ended pawl supported thereon and adjustable, whereby either end may be set to engage the toothed wheel, and a pitman having a rack engaging the toothed wheel, substantially as set forth.

2. In an apparatus for converting motion, the combination of the shaft, a toothed wheel and a pawl-support thereon, a double-ended pawl carried by the pawl-support, a pawl-tripper having a portion arranged to engage the pawl and movable, whereby it may adjust either end of said pawl into operative position, and a pitman having a rack to engage the toothed wheel, substantially as set forth.

3. In an apparatus for converting motion, the combination of the shaft, the toothed wheel thereon having a recess in its outer face, the pawl-support, also on said shaft and fitted at its inner end in the recess in the toothed wheel, the double-ended pawl carried by said support and adjustable, whereby either end may be set to engage the toothed wheel, and the pitman having a rack engaging the toothed wheel, substantially as set forth.

4. In an apparatus for converting motion, the combination of the shaft, the toothed wheel thereon, the pitman having a rack engaging said toothed wheel, the pawl-support, the double-ended pawl held adjustably to said support, and the pawl-tripper comprising a ring journaled on the pawl-support and a projection extended inwardly from the ring and arranged to engage the pawl, whereby by the partial turning of the ring the pawl may be adjusted to set either of its ends in operative position, substantially as set forth.

5. In an apparatus for converting motion, and in combination with the shaft, a toothed wheel and a pawl-support on such shaft, a double-ended pawl, and a pawl-tripper comprising a ring journaled on the pawl-support, a projection extended inwardly from said ring, and a spring for actuating such projection, substantially as set forth.

6. In an apparatus for converting motion, the combination of a shaft, a toothed wheel, and a frame-support thereon, a double-ended pawl carried by said pawl-support, a pawl-tripper journaled on the pawl-support and comprising a ring, I', having an opening or socket, i', and guides j at the outer end of said opening, a cover-plate, J, movable in said guides over the outer end of opening i', the projection i, fitting at its outer end in said opening or socket i', and a spring arranged in said socket and bearing between the projection i and the cover-plate J.

7. An apparatus, substantially as described, for converting motion, comprising the shaft, the toothed wheels thereon having their outer faces formed with recesses F, the pawl-carriers on the shaft, and fitted at their inner ends in the recesses F, and provided at such inner ends with recesses g, the pawls H, held in said recesses g, and adjustable, as described, the pawl-trippers having rings journaled on the pawl-carrier and having projections arranged to engage the pawls, and the slotted pitman having opposite racks, as specified.

8. In an apparatus, substantially as described, the combination of the pitman, the lever to which such pitman is connected, a frame in which such lever is pivotally supported, whereby it may be oscillated, and cushions arranged to be engaged by said lever at the ends of its stroke, substantially as and for the purposes specified.

9. In an apparatus, substantially as described, the combination of a lever having a toothed segment, m, and a toothed roller, m', and a frame, N, having racks n n', arranged opposite each other, such racks n n' being similar, whereby the lever may be reversed, as described.

10. In an apparatus for converting motion, the combination of the lever having openings or sockets O and the guide or keeper frame, the pitman, the spring-actuated locking-stud movable into and out of the sockets O, and the three armed or branched lever connected at the juncture of its arms with the stud, and adapted, when tilted in either direction, to release said stud from the sockets in the lever, substantially as set forth.

11. In combination with the pitman, the main lever, having sockets O and the spring-actuated locking-stud, the lever R, having arms r r r' and connected at the juncture of said arms to the stud, and a rod connected at one end to the arm r' of the lever R and extended along the handle end of the main lever, substantially as and for the purposes specified.

12. The combination of the main lever, having sockets O and guide or keeper frame O', having notches o, the pitman, the connecting-block, the spring-actuated stud arranged to enter sockets O, the lever R, having arms r r r' and connected at the juncture of such arms to the said stud, and the rod connected with the arm r' of lever R, substantially as set forth.

13. In an apparatus, substantially as described, the combination of the shaft, the toothed wheel thereon, the pawl support or carrier, the double-ended pawl, the pawl-tripping ring journaled on the pawl-support, and having a projection arranged to engage the pawl, and having an internal set of notches, and a spring-actuated stud supported in the pawl-carrier and engaging and movable from one to the other of the internal notches of the pawl-tripper ring, substantially as set forth.

14. The combination of the shaft, toothed wheel, and pawl-support thereon, the pawl, the pawl-tripper having a ring provided with internal notches, and the spring-actuated stud supported in the pawl-support and arranged to engage the said internal notches, and having at its outer end an extension projected along the outer side of the pawl-tripping ring, substantially as set forth.

15. The combination, with the framing, the shaft, the toothed wheels, the pawl-support, and the pawl-tripper ring having an outwardly-extended projection or projections, of a bar or lever supported on the framing and having an arm or portion movable into the path of such projection, whereby to effect an adjustment of the pawl-tripper, substantially as and for the purposes specified.

16. In an apparatus, substantially as described, the combination of the lever M, having openings O and dovetail groove P' and the guide-frame O', the block P, fitted in said groove P', the pitman, the spring-actuated stud entering the openings O, and a lever for operating said stud, substantially as set forth.

B. F. ANDREWS.

Witnesses:
P. B. TURPIN,
SOLON C. KEMON.